(12) United States Patent
Gupta et al.

(10) Patent No.: US 11,210,605 B1
(45) Date of Patent: Dec. 28, 2021

(54) DATASET SUITABILITY CHECK FOR MACHINE LEARNING

(71) Applicant: Amazon Technologies, Inc., Seattle, WA (US)

(72) Inventors: Pracheer Gupta, Seattle, WA (US); Andrea Olgiati, Seattle, WA (US); Poorna Chand Srinivas Perumalla, Seattle, WA (US); Stefano Stefani, Seattle, WA (US); Maden Mohan Rao Jampani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1165 days.

(21) Appl. No.: 15/658,005

(22) Filed: Jul. 24, 2017

(51) Int. Cl.
*G06N 20/00* (2019.01)
*G06F 17/18* (2006.01)
*G06F 16/28* (2019.01)

(52) U.S. Cl.
CPC ........... *G06N 20/00* (2019.01); *G06F 16/285* (2019.01); *G06F 17/18* (2013.01)

(58) Field of Classification Search
CPC ........ G06N 20/00; G06F 16/285; G06F 17/18
See application file for complete search history.

(56) References Cited

U.S. PATENT DOCUMENTS

| 2013/0060766 A1* | 3/2013 | Lin | G06K 9/4676 707/723 |
| 2018/0060738 A1* | 3/2018 | Achin | G06Q 30/0201 |
| 2020/0302337 A1* | 9/2020 | Jeffery | G06N 20/00 |

OTHER PUBLICATIONS

Vajda, Szilárd, and K. C. Santosh. "A fast k-nearest neighbor classifier using unsupervised clustering." International conference on recent trends in image processing and pattern recognition. Springer, Singapore, 2016. (Year: 2016).*

Keilwagen, Jens, Ivo Grosse, and Jan Grau. "Area under precision-recall curves for weighted and unweighted data." PloS one 9.3 (2014): e92209. (Year: 2014).*

* cited by examiner

*Primary Examiner* — Kevin W Figueroa
(74) *Attorney, Agent, or Firm* — Lowenstein Sandler LLP

(57) ABSTRACT

A processing device receives a dataset comprising a plurality of data points, wherein each data point of the plurality of data points comprises a representative vector for the data point and an associated classification for the data point. The processing device determines, for the dataset, a score representative of a degree of clustering of the plurality of data points. The processing device determines a suitability of the dataset for use in machine learning based on the score.

20 Claims, 11 Drawing Sheets

DATASET SUITABILITY CHECK FOR MACHINE LEARNING

BACKGROUND

In machine learning, users often convert each of their input examples from a dataset into a representative vector (e.g., a feature vector), often referred as an embedding. The quality of this embedding affects the ultimate quality of a model that is generated from the dataset using machine learning techniques. For example, the model may apply a k-nearest neighbors search based on the dataset to new incoming data to classify (e.g., assign a label to) that new incoming data. The quality of the embeddings may affect the accuracy of the classification assigned to the new incoming data by the model.

Historically users test the accuracy of a machine learning model after that model is generated. The accuracy of the model is generally tested by reserving a percentage of data points from a training dataset and not using those data points in the generation of the model. These reserved data points are then classified using the machine learning model. These reserved data points have known classifications, and the known classifications are compared to the classifications assigned by the model. If the model assigns too many incorrect classifications, then the user determines that the model is a poor model. However, this technique for testing the machine learning model is not a test of the quality of the training dataset that was used to generate the model.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

DETAILED DESCRIPTION

Figure 1:
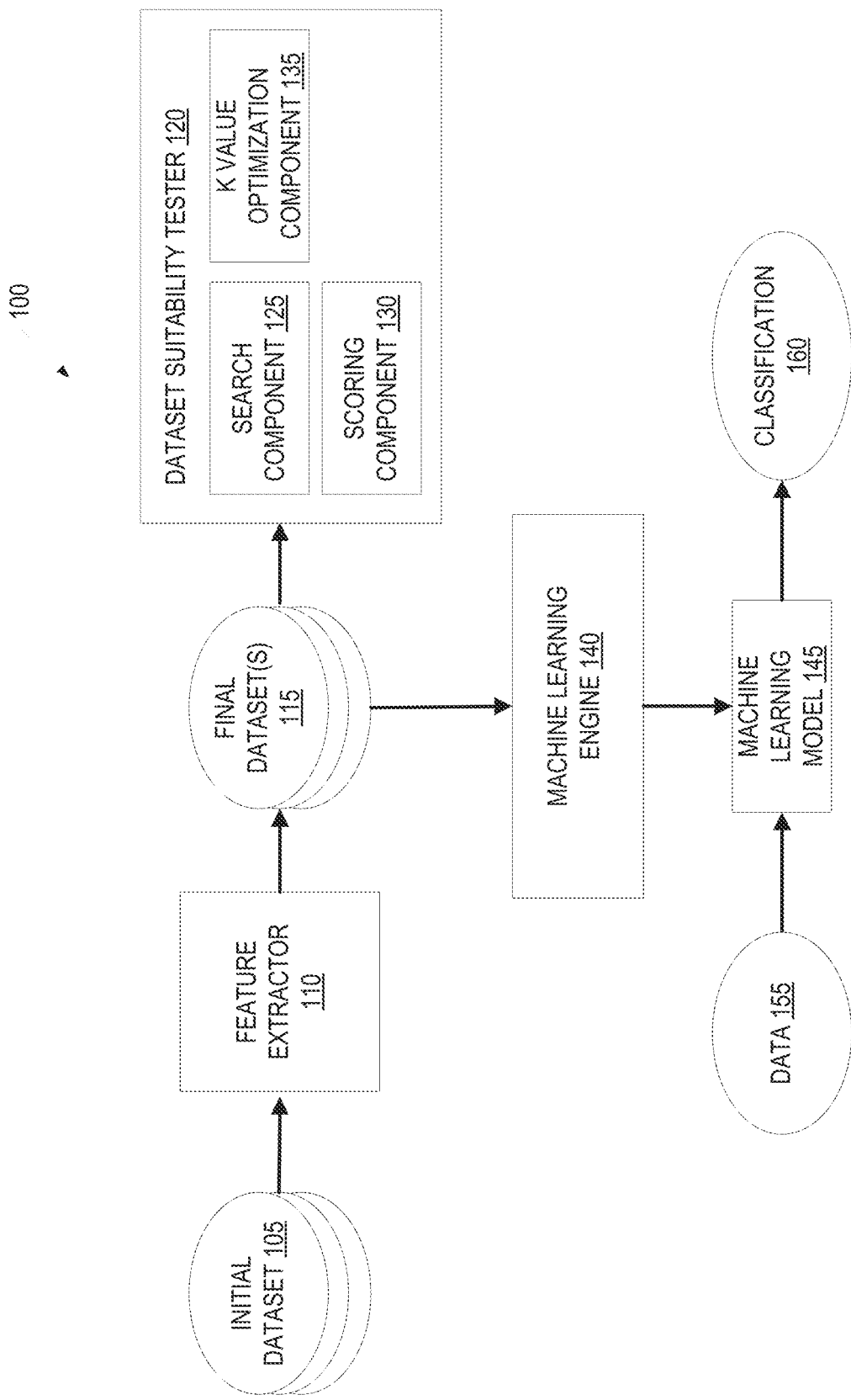
FIG. 1 illustrates a system for testing the quality of a dataset and generating a machine learning model, according to one embodiment of the present disclosure.

The present disclosure relates to techniques for testing the suitability of a dataset (e.g., a training dataset) for use in machine learning, such as for use in a k-nearest neighbors search machine learning technique. In order for the dataset to be used for machine learning, representative vectors should be generated for each data point in the dataset. However, there are many techniques for generating or extracting representative vectors from data points, and there are many different possible representative vectors that can be extracted from the same data. Some representative vectors for a dataset may result in higher quality machine learning models that more accurately classify new data than other machine learning models generated using other representative vectors for the same dataset. Accordingly, in one embodiment a method is performed to test the suitability of a dataset having representative vectors for a set of data points for use in machine learning. In one embodiment, a system tests the suitability of a dataset having representative vectors for each data point for use in machine learning. If the dataset is unsuitable for use in machine learning, then a user may generate new representative vectors for the data points in the dataset and the dataset may again be tested using the new representative vectors. This process may be performed any number of times until a suitable dataset (e.g., a training dataset with suitable representative vectors) is determined. By testing the suitability of a dataset with a particular set of representative vectors (also referred to as embeddings) rather than testing a generated machine learning model for accuracy, the process of generating machine learning models can be improved. For example, by testing the dataset for suitability in machine learning, fewer machine learning models will likely be generated, resulting in less time and less resource utilization. Moreover, the accuracy of the machine learning models that are ultimately created may be improved.

In one embodiment, a dataset comprising a plurality of data points is received, wherein each data point of the plurality of data points comprises a representative vector for the data point and an associated classification for the data point. A score representative of a degree of clustering of the plurality of data points is then determined for the dataset. A suitability of the dataset for use in machine learning is then determined based on the score.

In one embodiment, a device comprising a processing device and a memory performs a plurality of k-nearest neighbors search queries with various values of k on a dataset, wherein the dataset comprises a plurality of data points, and wherein each data point of the plurality of data points comprises a representative vector for the data point and an associated classification for the data point. The device determines a score representative of a degree of clustering of the plurality of data points from results of the plurality of k-nearest neighbors search queries. The device then determines a suitability of the dataset for a k-nearest neighbors search based on the score.

In one embodiment, a non-transitory computer-readable storage device stores computer-executable instructions that, if executed by a processing device, cause the processing device to perform operations for testing the suitability of a dataset for use in machine learning. In one embodiment, the operations include performing a plurality of search queries on a dataset, wherein the dataset comprises a plurality of data points, and wherein each data point of the plurality of data points comprises a representative vector for the data point and an associated classification for the data point. In one embodiment, the operations further include determining a score representative of a degree of clustering of the plurality of data points from results of the plurality of search queries. In one embodiment, the operations further include determining a suitability of the dataset for a machine learning technique based on the score.

Referring now to the figures, FIG. 1 illustrates a system 100 for testing the quality of a dataset and generating a machine learning model, according to one embodiment of the present disclosure. The system 100 includes a feature extractor 110, a dataset suitability tester 120, a machine learning engine 140 and a machine learning model 145. Each of the feature extractor 110, dataset suitability tester 120, machine learning engine 140 and/or machine learning model 145 may be installed on separate computing devices. Alternatively, one or more of the feature extractor 110, dataset suitability tester 120, machine learning engine 140 and/or machine learning model 145 may be installed on the same computing device.

In one embodiment, the computing devices may each be one of a mobile phone, a smart phone, a laptop computer, a tablet computer, a netbook, a notebook, a desktop computer, a gaming console, a server computer (e.g., a rackmount server), or other type of computing device. In one embodiment, one or more of the computing devices is a server computing device such as a rackmount server. The server computing devices may include physical machines and/or virtual machines hosted by physical machines. The physical machines may be rackmount servers, desktop computers, or other computing devices. In one embodiment, the server computing devices include virtual machines managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. If multiple computing devices are used, then the computing devices may be connected via a network (e.g., a local area network (LAN), wide area network (WAN), wireless network, intranet, the Internet, or a combination thereof), a direct wired connection (e.g., via an Ethernet connection, a universal serial bus (USB) connection, a Firewire connection, a Lightning connector, a peripheral component interconnect express (PCIe) connection, a serial connection, a small computer system interface (SCSI) connection, or a wireless connection (e.g., a Bluetooth® connection, a ZigBee® connection, etc.).

In one embodiment, feature extractor 110 is a component that extracts one or more features from an initial dataset 105 to generate representative vectors (embeddings) of the data points in the initial dataset 105. Feature extractor 110 starts from the initial dataset and builds derived values (the features) therefrom. The combination of features extracted from a single item of data constitutes the representative vector or embedding for that item of data, referred to herein as a data point. After feature extraction has been performed on the data in the initial dataset 105, a final dataset 115 may be generated. The final dataset 115 may include a distinct representative vector for each item of data from the initial dataset 105. In one embodiment, each data point in the final dataset 118 additionally includes a categorization or label that has been assigned to that data point. For example, if images are to be categorized into a first category of "a car" and a second category of "not a car", then each of the data points may be labeled either as a car or as something other than a car.

The combination of features in the representative vector (also referred to as a feature vector) for a data point should be representative of the item of data and non-redundant with the representative vectors of other data points. How to perform feature extraction may depend at least in part on the type of data in the dataset, such as images, audio files, text, video, and so on. Techniques for feature extraction may include independent component analysis (ICA), isomaps, principal component analysis (PCA), latent semantic analysis, partial least squares, multifactor dimensionality reduction, nonlinear dimensionality reduction, multilinear PCA, multilinear subspace learning, and neural networks, just to name a few. Different techniques and algorithms may be applied by feature extractor 110 to extract different representative vectors from the same initial dataset 105. For example, feature extractor 110 may use one or more first feature extraction techniques and/or parameters to generate a first final dataset and may use one or more second feature extraction techniques and/or parameters to generate a second final dataset. These representative feature vectors for the same items of data may be completely different from one another or may be slightly different from one another between final datasets 115.

In one embodiment, dataset suitability tester 120 tests the suitability of one or more final datasets 115 for use in machine learning. In one embodiment, dataset suitability tester 120 tests the suitability of one or more final datasets 115 for a k-nearest neighbors search machine learning technique. The k-nearest neighbors search (k-NNS) is a search for the k points in a given set (e.g., final dataset 115) that are closest or most similar to a given data point. In one embodiment, closeness is expressed in terms of a dissimilarity function in which the less similar the data points, the larger the function values. The k-NN search problem may be defined as follows: given a set S of data points in a space M and a query data point q∈M, find the k closest points in S to q, where the space M is an n-dimensional vector space, and where n is equal to the dimensionality of the representative vectors for the data points in the final dataset 115. Dissimilarity between data points may be measured using Euclidian distance, Manhattan distance, or another distance metric.

There are multiple different types of k-NNS queries that may be performed. Some examples are provided herein. However, the disclosure is not limited to any particular k-NNS queries. Some example k-NNS techniques include a linear search and a search that uses space-partitioning methods. Additionally, k-NNS techniques may be used to find exact solutions or to find approximate solutions. An approximation method for a k-NN search is permitted to return a point that might not be the closest point, but whose distance is at most c times the distance from the query data point to the closest point, where c can be selected. Some approximation methods for k-NN searches include locality sensitive hashing, reduced intrinsic dimensionality, projected radial search, vector approximation files, compression or clustering based searches, and so on. Alternatively, dataset suitability tester 120 may test the suitability of one or more final datasets 115 for other machine learning techniques.

In one embodiment, dataset suitability tester 120 includes a search component 125, a scoring component 130, and a k value optimization component 135. Alternatively, dataset suitability tester 120 may include greater or fewer components. In one embodiment, search component 125 performs multiple searches using the final dataset 115. In one embodiment, search component 125 performs a plurality of k-nearest neighbor search queries with various values of k on the final dataset 115. In one embodiment, multiple different k-nearest neighbors searches are performed for multiple different data points from the final dataset 115. For example, a first k-nearest neighbors search may be performed for a first data point using a value of k=1, a second k-nearest neighbors search may be performed for the first data point using a value of k=2, a third k-nearest neighbors search may be performed for the first data point using a value of k=3, and so on up until a search query is performed using a maximum value of k. Alternatively, a different starting value of k may be used, such as k=2, k=3, and so on. In one embodiment, the maximum value of k is a set size (s) of the final dataset 115 minus 1. In one embodiment, the value of k is incremented by one for each successive k-nearest neighbors search. Accordingly, up to s−1 k-nearest neighbors search queries may be performed for the first data point. In one embodiment, the value of k is incremented by some value other than 1. For example, the value of k may be incremented by 2 (e.g., such that k-nearest neighbors searches are performed using values of k=1, 3, 5, 7, and so on or k=2, 4, 6, 8, and so on), may be incremented by 3 (e.g., such that k-nearest neighbors searches are performed using values of k=1, 4, 7, 10, and so on or k=3, 6, 9, 12, and so on), etc. The starting value of k, the value of increment, and the terminal value (maximum value of k to be used for a search query) may be selected based on a size of the final dataset 115 and a target level of accuracy for the quality determination of the final dataset 115.

Search component may proceed to perform a plurality of k-nearest neighbors search queries for a next data point. In one embodiment, the number of k-nearest neighbors search queries performed for the next data point is the same as the number of k-nearest neighbors search queries performed for the first data point. In one embodiment, the same values of k are used for the k-nearest neighbors search queries performed on the next data point as were performed on the first data point. Additional k-nearest neighbors search queries may be computed for one or more additional data points from the final dataset 115. In one embodiment, the same number of k-nearest neighbors search queries is performed for each data point for which search queries are performed. In one embodiment, the same values of k are used for the k-nearest neighbors search queries performed on each data point that is searched. In one embodiment, k-NNS queries are performed for all data points of the dataset. Alternatively, k-NNS queries may be performed for a subset of the data points in the dataset. In one embodiment, the data points to be used for the k-NNS queries are selected randomly or pseudo-randomly.

The results of the multiple k-nearest neighbors search queries that are performed may be used to determine a suitability of the final dataset 115 for use in a k-nearest neighbors search or other machine learning technique. In one embodiment, scoring component 130 determines a score for the dataset based on the results of the multiple k-NNS queries. The score may represent a level of clustering of the data points from the final dataset around classifications. For a dataset where embeddings are nicely clustered and all points in a cluster have the same classification (label) which is not shared by any other point in any other cluster, the value returned may be maximal (e.g., 1 in one embodiment). On the other hand, if the embeddings of a given category or label are interspersed with embeddings from another category or label, the value of the score will be lower (e.g., closer to 0 in an embodiment). In one embodiment, values closer to 0 indicate a lower quality of embedding and a low suitability of the final dataset 115 for use in a k-NN search or other machine learning technique.

In one embodiment, to compute the score the scoring component 130 generates a plurality of precision-response (P-R) curves for each of the data points on which k-NNS queries were run. In one embodiment, the scoring component then computes the areas under each of the P-R curves that were generated. Scoring component can then compute the score based on the combined areas under the P-R curves. In one embodiment, scoring component 130 determines the areas under each of the P-R curves. In one embodiment, scoring component 130 then determines an average of the areas under the P-R curves. The average area under the P-R curves may be used as the score. Alternatively, the score may be computed based on the average area under the P-R curves. The score (e.g., the average area under the P-R curves for all of the data points) gives a quantitative measure of a quality of the final dataset 115 (e.g., of the representative vectors or embeddings in the final dataset 115). Accordingly, the score provides a quantitative measure of the suitability of the dataset 115 (e.g., of the representative vectors or embeddings in the final dataset 115) for use in a k-NNS or other machine learning technique.

In one embodiment, scoring component determines x percent of the data points with the largest area under the P-R curve and x percent of the data points with the smallest area under the P-R curve. X may be a value such as 2%, 5%, 10%, 15%, and so on. The determined x percent of the data points with the largest area under the P-R curve and the x percent of the data points with the smallest area under the P-R curve may be discarded in one embodiment prior to averaging the areas under the P-R curves. These data points may represent noise in some instances. Accordingly, removing these data points from the score calculation may improve an accuracy of the score in identifying the quality of the final dataset 115 and suitability of the final dataset 115 for use in k-NNS or another machine learning technique.

In one embodiment, dataset suitability tester 120 may compute scores for multiple different final datasets 115, where each of the final datasets may have been generated from the same initial dataset 105 but may have different representative vectors for data points from the initial dataset 105. Dataset suitability tester 120 may then compare the scores for the different final datasets 115 to identify the final dataset 115 having the highest score. The final dataset with the highest score may then be used to generate a machine learning model.

In addition to determining the quality of embeddings for a dataset and the suitability of the dataset for use in a k-NN search, dataset suitability tester 120 may also determine an optimal value of k to use for a k-NN search. In one embodiment, k value optimization component 135 determines the optimal value of k to use for a k-NN search based on the final dataset 115. To determine the optimal value of k for the final dataset 115, k value optimization component may invoke search component to perform search queries using different values of k. For two or more maximal values of k that are used for the k-nearest neighbor search queries, separate P-R curves may be generated. For example, a first set of P-R curves may be generated for values of k from 1-5, a second set of P-R curves may be generated for values of k from 1-6, a third set of P-R curves may be generated for values of 1-7, and so on. Scoring component 130 may then be invoked to generate scores for each of the sets of P-R curves (e.g., a first score for a maximum k of 5, a second score for a maximum k of 6, a third score for a maximum k of 7, and so on). The value of k with the highest score (e.g., the highest average area under the P-R curve) may then be identified as the optimal value of k for the final dataset 115. In one embodiment, the value of k with the highest score is used in the machine learning model 145.

In one embodiment, the final dataset 115 may grow over time as new data becomes available. In one embodiment, dataset suitability tester 120 repeats the computation of the score (or scores) for the final dataset 115 and determines whether the suitability of the final dataset 115 for use in machine learning (e.g., in a k-NNS) is increasing or decreasing over time. In one embodiment, illustrations of one or more P-R curves are provided to a user to aid in visualization of the quality of the dataset.

Once a dataset 115 is determined to be suitable for a machine learning model that applies a k-NN search, the final dataset 115 may be provided to machine learning engine 140 along with a value for k. Machine learning engine 140 may then generate a machine learning model 145 (a model produced using machine learning techniques) from the final dataset 115 that performs a k-NN search. The machine learning model 145 may receive new data 155 that is unclassified, and perform feature extraction on the new data 155. Alternatively, feature extraction may already have been performed on the data 155. A representative vector (embedding) for the data 155 may then be used as the data point used for a k-NN search, where the final dataset 115 represents the other data points that are searched. The category assigned to the majority of the k-nearest neighbors that are identified may then be selected as the classification 160 for the data 155.

Figure 2:
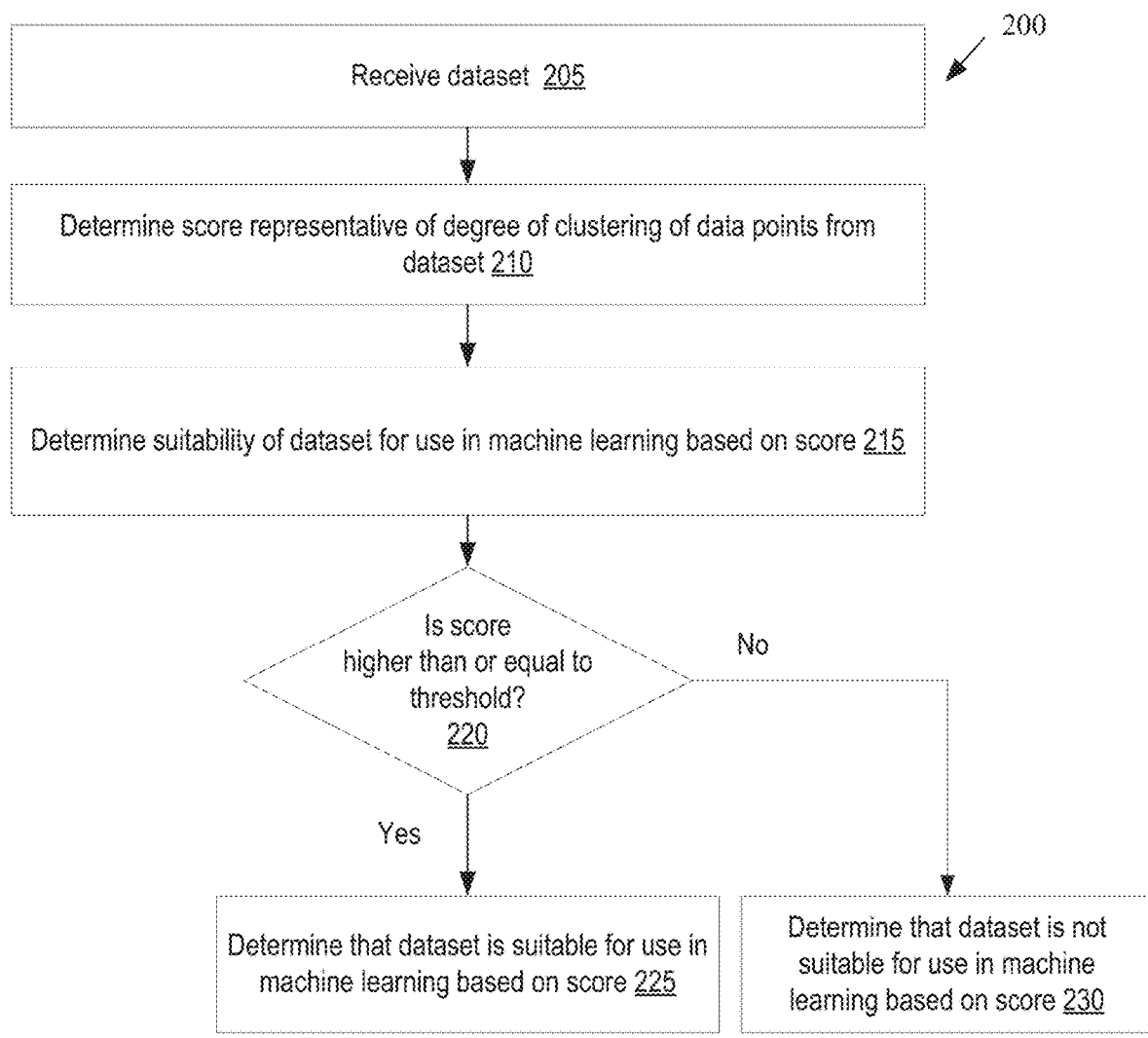
FIG. 2 depicts a flowchart illustrating one embodiment for a method of determining the suitability of a dataset for use in machine learning.
Figure 3:
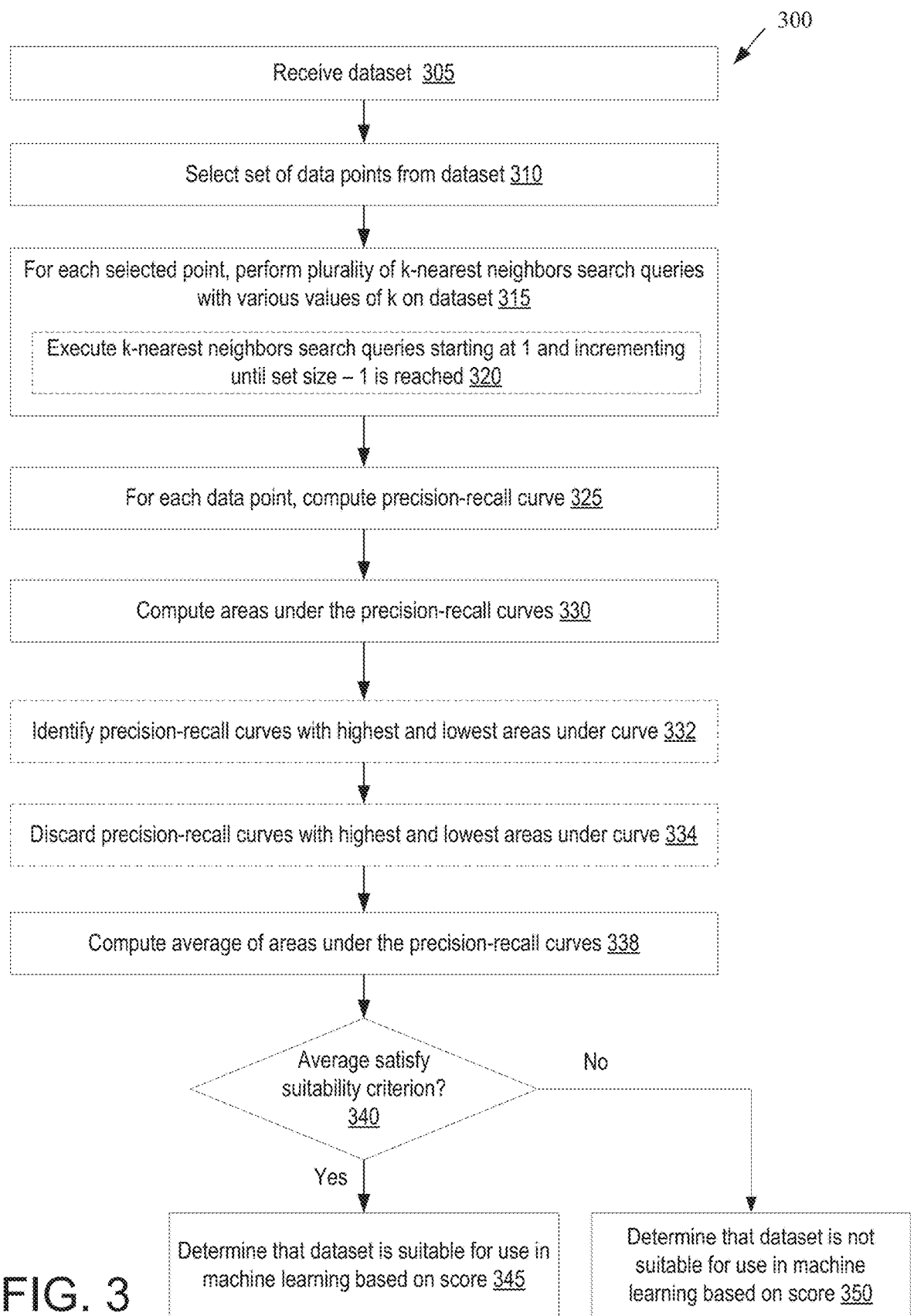
FIG. 3 depicts a flowchart illustrating one embodiment for a method of determining the suitability of a dataset for use in machine learning.

FIGS. 2-3 are flow diagrams showing various methods for determining the suitability of a dataset for use in machine learning, in accordance with embodiments of the invention. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a computing device executing a dataset suitability tester, such as dataset suitability tester 120 of FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 2 depicts a flowchart illustrating one embodiment for a method 200 of determining the suitability of a dataset (e.g., a training dataset) for use in machine learning. At block 205, processing logic receives a dataset. The dataset includes a plurality of points, where each data point of the plurality of data points comprises a representative vector for the data point and an associated classification for the data point. At block 210, processing logic determines a score representative of a degree of clustering of the data points from the dataset. In one embodiment, the score is computed by performing a plurality of k-NNS queries using various values of k on the data points from the dataset. In one embodiment, P-R curves are generated for two or more of the data points, and the score is determined based on a combination (e.g., an average, median, etc.) of values from the plurality of P-R curves. In one embodiment, areas under each of the plurality of P-R curves are computed, and the score is determined by computing an average of the areas under the P-R curves.

At block 215, a suitability of the dataset for use in machine learning (e.g., for use in a machine learning model that applies a k-NN search) is determined. The suitability may be determined from the score computed at block 210. In one embodiment, a high score indicates a high level of suitability and a low score indicates a low level of suitability. In one embodiment, the score is a value between 0 and 1, with values close to 1 representing high level of suitability and values close to 0 representing low level of suitability.

In one embodiment, at block 220, processing logic determines whether the score is high than or equal to a threshold. If the score is higher than or equal to the threshold, then the dataset may have sufficient quality to use for machine learning, and the method may continue to block 225. At block 225, the dataset is therefore determined to be suitable for use in machine learning based on the score. If the score is lower than the threshold, then the dataset may have an insufficient quality to use for machine learning, and the method may proceed to block 230. At block 230, the dataset is therefore determined to be unsuitable for use in machine learning based on the score.

FIG. 3 depicts a flowchart illustrating one embodiment for a method 300 of determining the suitability of a dataset for use in machine learning. At block 305, processing logic receives a dataset. The dataset includes a plurality of points, where each data point of the plurality of data points comprises a representative vector for the data point and an associated classification for the data point. At block 310, processing logic selects a set of points from the dataset. In one embodiment, processing logic selects all points from the dataset. Alternatively, processing logic may select fewer than all points from the dataset (e.g., 80% of the points). At block 315, for each selected point processing logic performs a plurality of k-NNS queries using various values of k. In one embodiment, at block 320 processing logic executes k-nearest neighbor search queries starting at 1 (or another staring value of k) and incrementing k by a value (e.g., 1, 2, 3, or another fixed value) until a maximum value of k is reached. The maximum value of k may be, for example, the set size (s) minus 1. In one embodiment, the starting value of k is 1, and the value of k is incremented by 1 until a maximum value of k is reached, where the maximum value of k is the set size (s) minus 1.

At block 325, for each k-nearest neighbors search query response performed at block 315, processing logic computes a precision-recall curve. In the present context, precision refers to the fraction of retrieved data points that have a correct classification (that are relevant) among the retrieved data points, while recall refers to the fraction of data points with the correct classification that have been retrieved over the total number of correctly classified data points within the query. Precision and recall may be represented algorithmically as:

$$\text{Precision} = \frac{tp}{tp + fp}$$

$$\text{Recall} = \frac{tp}{tp + fn}$$

Where tp represents true positives (correct classification), fp represents false positives, and fn represents false negatives. A precision-recall curve is a plot of precision vs. recall.

At block 330, processing logic computes the areas under each of the P-R curves. In one embodiment, at block 332 processing logic identifies the P-R curves with the highest and lowest areas under the curve. In one embodiment, at block 334 processing logic discards those P-R curves with the highest and lowest areas under the curve. Processing logic may identify and discard the x % of P-R curves with the highest and lowest areas under there curves, where the value of x may be selected.

At block 338, processing logic computes an average of the areas under the P-R curves. At block 340, processing logic determines whether the average of the areas under the P-R curves satisfies a suitability criterion. In one embodiment, the average is compared to a threshold. If the average meets or exceeds the threshold, then the suitability criterion may be satisfied. If the average fails to meet the threshold, then the suitability criterion may not be satisfied. Example threshold values include 0.75, 0.8, 0.9, 0.95, 0.98, and so on. If the suitability criterion is satisfied, the method continues to block 345 and it is determined that the dataset is suitable for use in machine learning (e.g., for use in a k-NNS) based on the score. If the suitability criterion is not satisfied, the method proceeds to block 350 and it is determined that the dataset is unsuitable for use in machine learning (e.g., for use in a k-NNS) based on the score.

Figure 4:
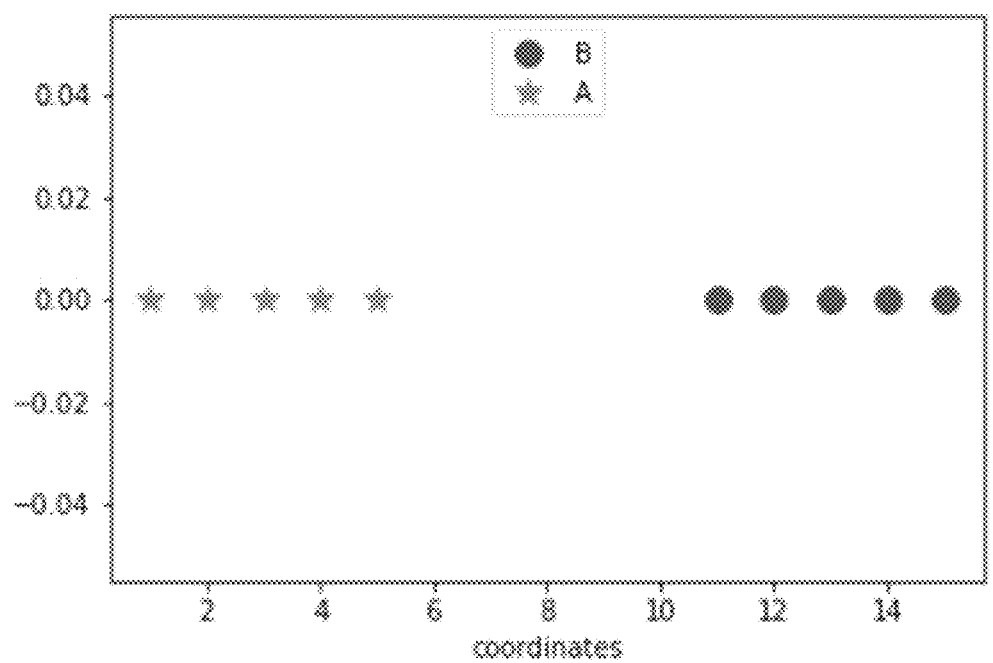
FIG. 4. is a graph of an example high quality dataset in a 1-dimensional space that is suitable for use in a k-nearest neighbors search machine learning technique, in accordance with one embodiment of the present invention.

FIG. 4. is a graph of an example high quality dataset in a 1-dimensional space that is suitable for use in a k-nearest neighbors search machine learning technique, in accordance with one embodiment of the present invention. A 1-dimensional space is shown merely for ease of visualization purposes. Actual datasets may have up to tens, hundreds or even thousands of dimensions. As shown, this set of data points is nicely clustered. These points have the values of (A1, 1, A), (A2, 2, A), (A3, 3, A), (A4, 4, A), (A5, 5, A), (B1, 11, B), (B2, 12, B), (B3, 13, B), (B4, 14, B), and (B5, 15, B). For each tuple, the first value is the identifier for a particular data point, the second value is a position in a 1D space, and the third value is the label or classification for the data point. All data points with a label A are close together and are sufficiently far off from all points with label B. The distance between A5 and B1 is greater than the distance between A5 and A1, for example.

Figure 5:
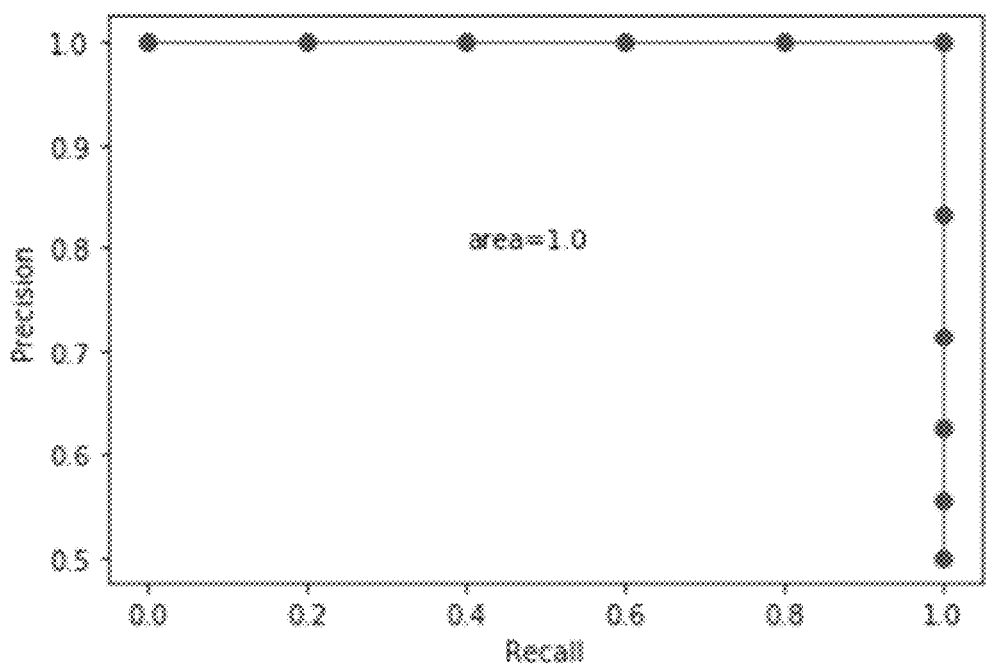
FIG. 5. illustrates precision-recall curves of each of the data points from the dataset shown in FIG. 4, in accordance with one embodiment of the present invention.

FIG. 5. illustrates precision-recall curves of each of the data points from the dataset shown in FIG. 4, in accordance with one embodiment of the present invention. In one embodiment, in order to compute the P-R curve for a given point (referred to as the main point for a given P-R curve), processing logic sorts the other points based on the distance between the main point and every other point. Processing logic goes through this sorted list one-by-one checking if the point has the same label as the main point. The P-R curve is then calculated depending on how many points with the same label have been seen so far. In one embodiment, the main point is included as the zeroth point for computation of precision, but not for computation of recall. Accordingly, the precision and recall for a first closest point in FIG. 5 are precision=(2/(2+0))=1, and recall=(1/(1+4))=0.2. Alternatively, the main point may not be included in the computation of precision. In one embodiment, the following code may be used to plot the P-R curve based the dataset:

```
totalArea=0.0
plot(points)
for mainPoint in points:
    P=[1]
    R=[0]
    TotalCorrect=len(list(filter(lambda point: point[2]
        ==mainPoint[2], points)))
    pointsSortedByD=sorted(points, key=lambda point:
        abs(mainPoint[1]-point[1]))
    correct=incorrect=0
    for point in pointsSortedByD:
        if point[2]==mainPoint[2]:
            correct+=1
        else:
            incorrect+=1
        P.append(correct/(correct+incorrect))
        R.append(correct/TotalCorrect)
    area=trapz(P, x=R)
    plt.plot(R, P, 'ro')
    plt.plot(R, P, lw=1)
    plt.title("P/R curve for"+mainPoint[0])
    plt.ylabel('Precision')
    plt.xlabel('Recall')
    text="area="+repr(area)
    plt.text(0.4, 0.8, text)
    plt.show( )
    totalArea+=area
return(totalArea/len(points))
```

FIG. 5 represents the P-R curve for each of the data points from the dataset shown in FIG. 4, as the P-R curves for each data point is the same in this example. The leftmost point in the P-R curve is a starting set point of (1,0). Other staring set points may also be used with equal effectiveness, so long as the same starting set point is used for each P-R curve. For example, the starting set point may be (0,0) for each P-R curve. As shown, the area under the P-R curves is 1, and so the average area under the P-R curves is also 1, representing a perfect score in one embodiment.

Figure 6:
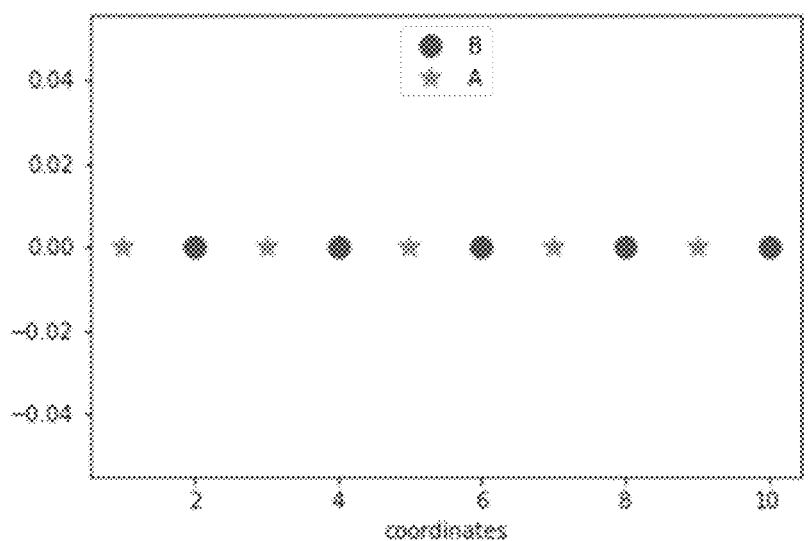
FIG. 6. is a graph of an example low quality dataset in a 1-dimensional space that is not suitable for use in a k-nearest neighbors search machine learning technique, in accordance with one embodiment of the present invention.

FIG. 6. is a graph of an example low quality dataset in a 1-dimensional space that is not suitable for use in a k-nearest neighbors search machine learning technique, in accordance with one embodiment of the present invention. As shown, this set of data points consists of points that are placed alternately (e.g., the labels alternate between A and B). These points have the values of (A1, 1, A), (B1, 2, B), (A2, 3, A), (B2, 4, B), (A3, 5, A), (B3, 6, B), (A4, 7, B), (B4, 8, B), (A5, 9, A), and (B5, 10, B). For each tuple, the first value is the identifier for a particular data point, the second value is a position in a 1D space, and the third value is the label or classification for the data point.

Figure 7A:
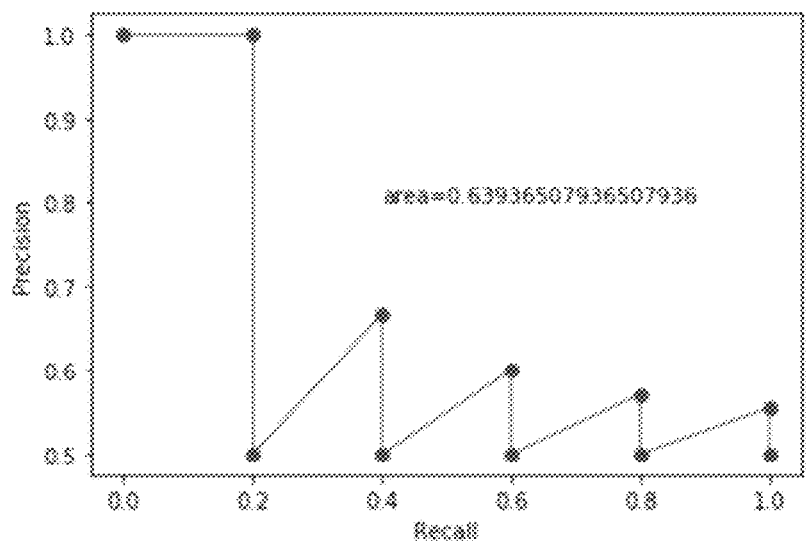
FIGS. 7A-7J illustrate precision-recall curves of each of the data points from the dataset shown in FIG. 6, in accordance with one embodiment of the present invention.
Figure 7B:
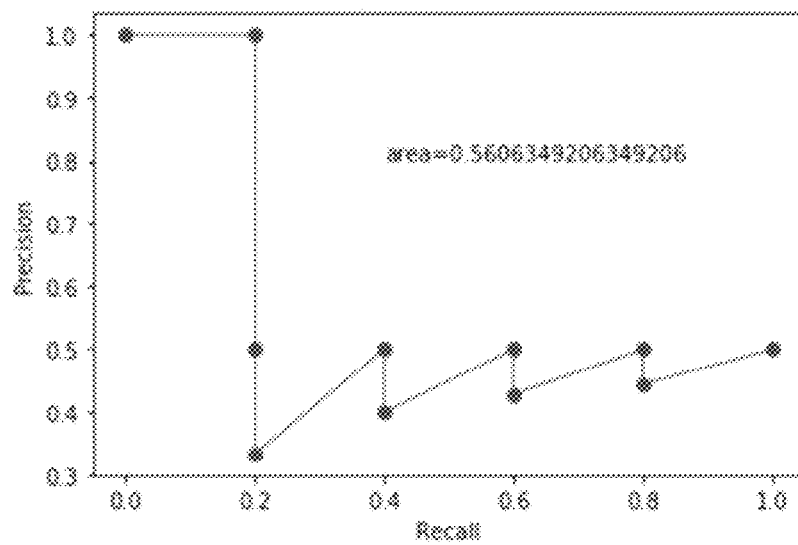
Figure 7C:
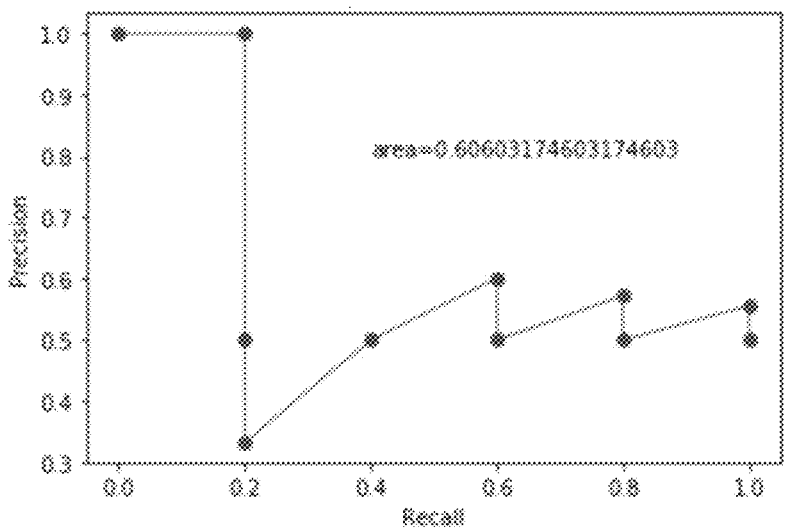
Figure 7D:
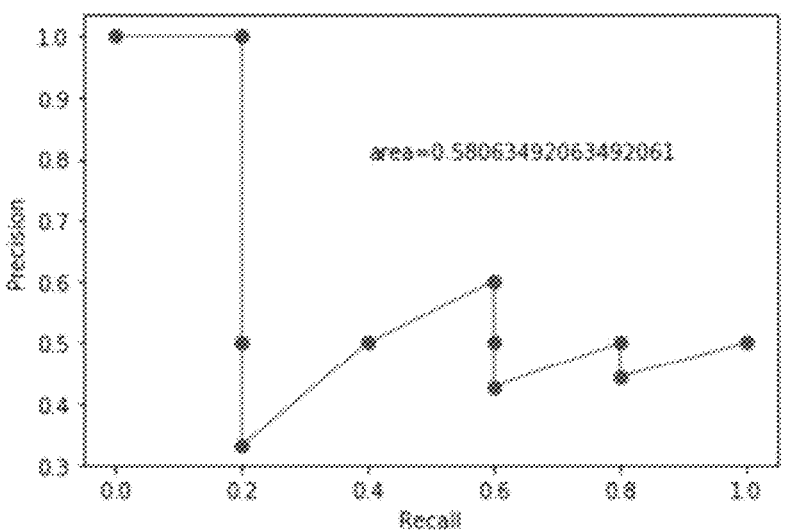
Figure 7E:
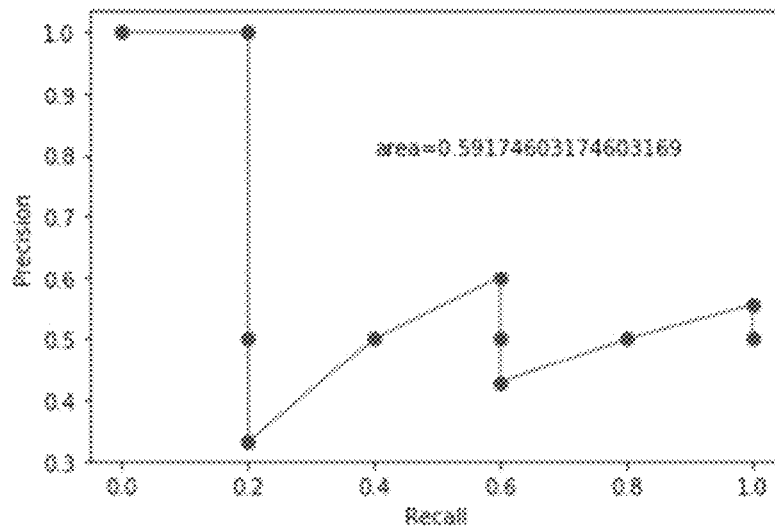
Figure 7F:
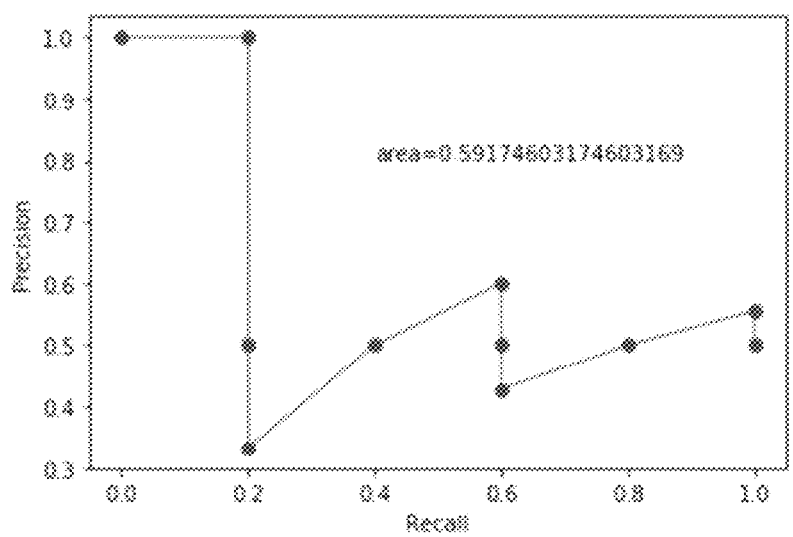
Figure 7G:
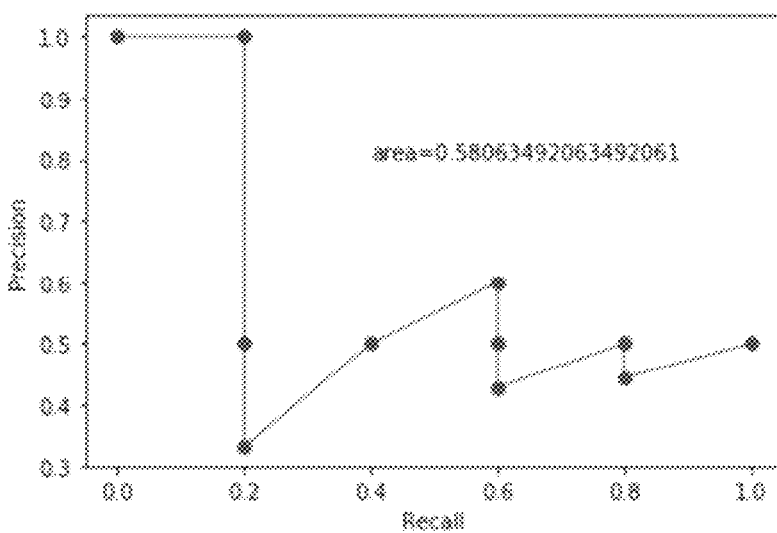
Figure 7H:
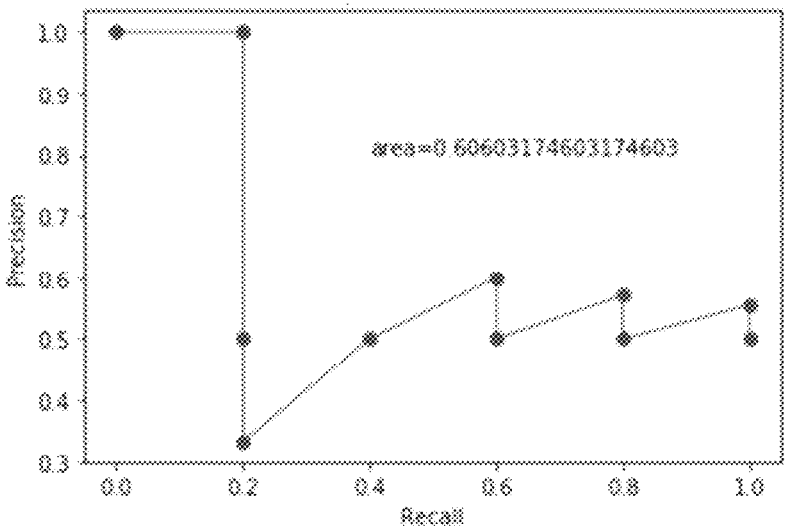
Figure 7I:
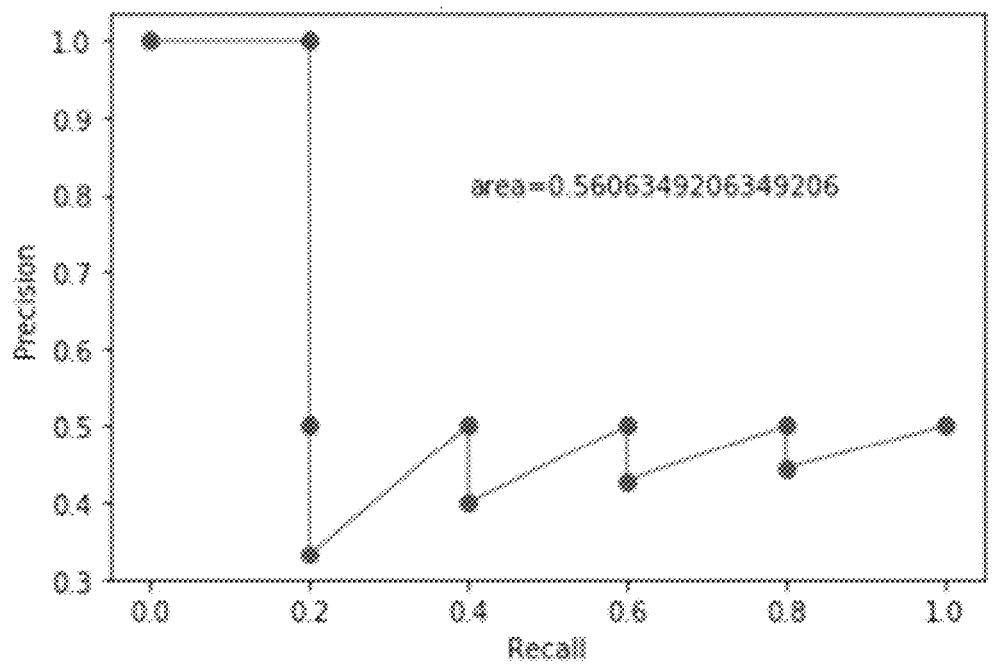
Figure 7J:
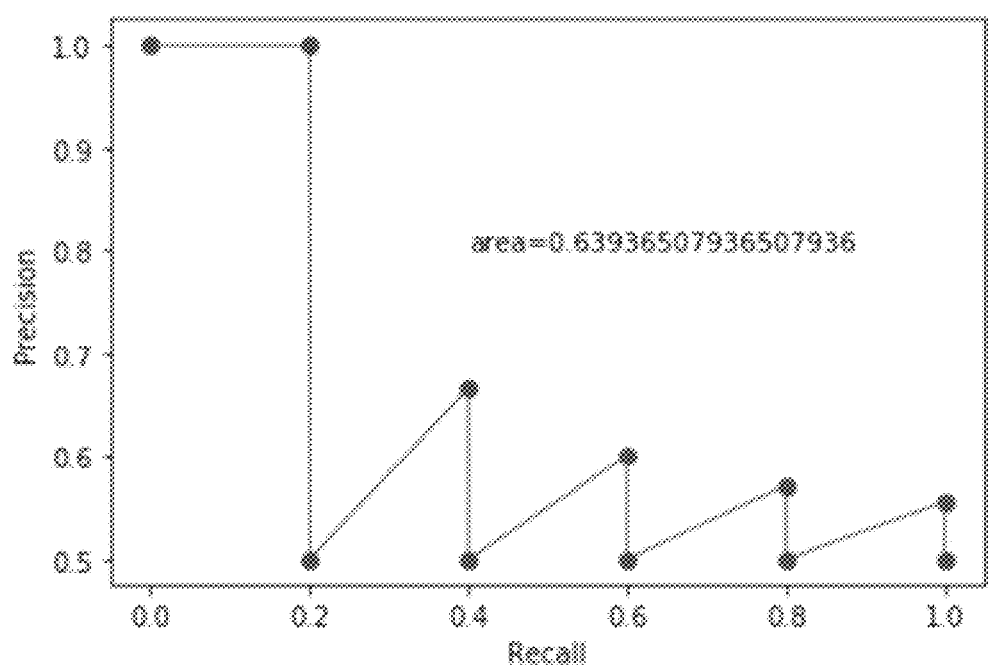

FIGS. 7A-7J illustrate precision-recall curves of each of the data points from the dataset shown in FIG. 6, in accordance with one embodiment of the present invention. FIG. 7A is the P-R curve for point A1, FIG. 7B is the P-R curve for point B1, FIG. 7C is the P-R curve for point A2, FIG. 7D is the P-R curve for point B2, FIG. 7E is the P-R curve for point A3, FIG. 7F is the P-R curve for point B3, FIG. 7G is the P-R curve for point A4, FIG. 7H is the P-R curve for point B4, FIG. 7I is the P-R curve for point A5, and FIG. 7J is the P-R curve for point B5. As shown, the areas under the P-R curves are 0.64 for FIG. 7A, 0.56 for FIG. 7B, 0.61 for FIG. 7C, 0.58 for FIG. 7D, 0.59 for FIG. 7E, 0.59 for FIG. 7F, 0.58 for FIG. 7G, 0.61 for FIG. 7H, 0.56 for FIG. 7I and 0.64 for FIG. 7J. The average area under the curve for the dataset shown in FIG. 6 is therefore 0.60, which is much lower than the average area under the curve for the dataset of FIG. 4.

Figure 8:
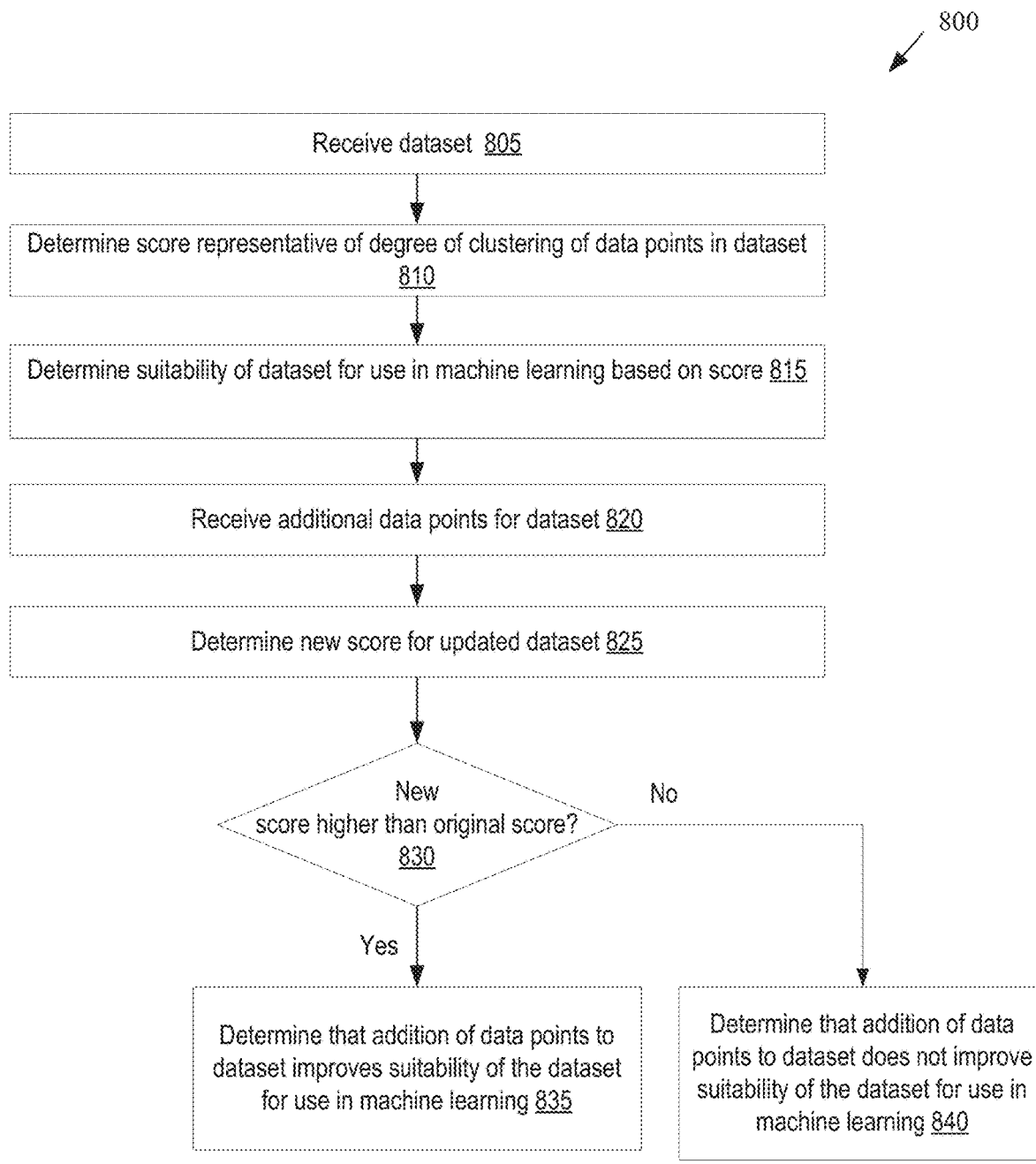
FIG. 8 depicts a flowchart illustrating one embodiment for a method of determining the change over time in the suitability of a dataset for use in machine learning.
Figure 9:
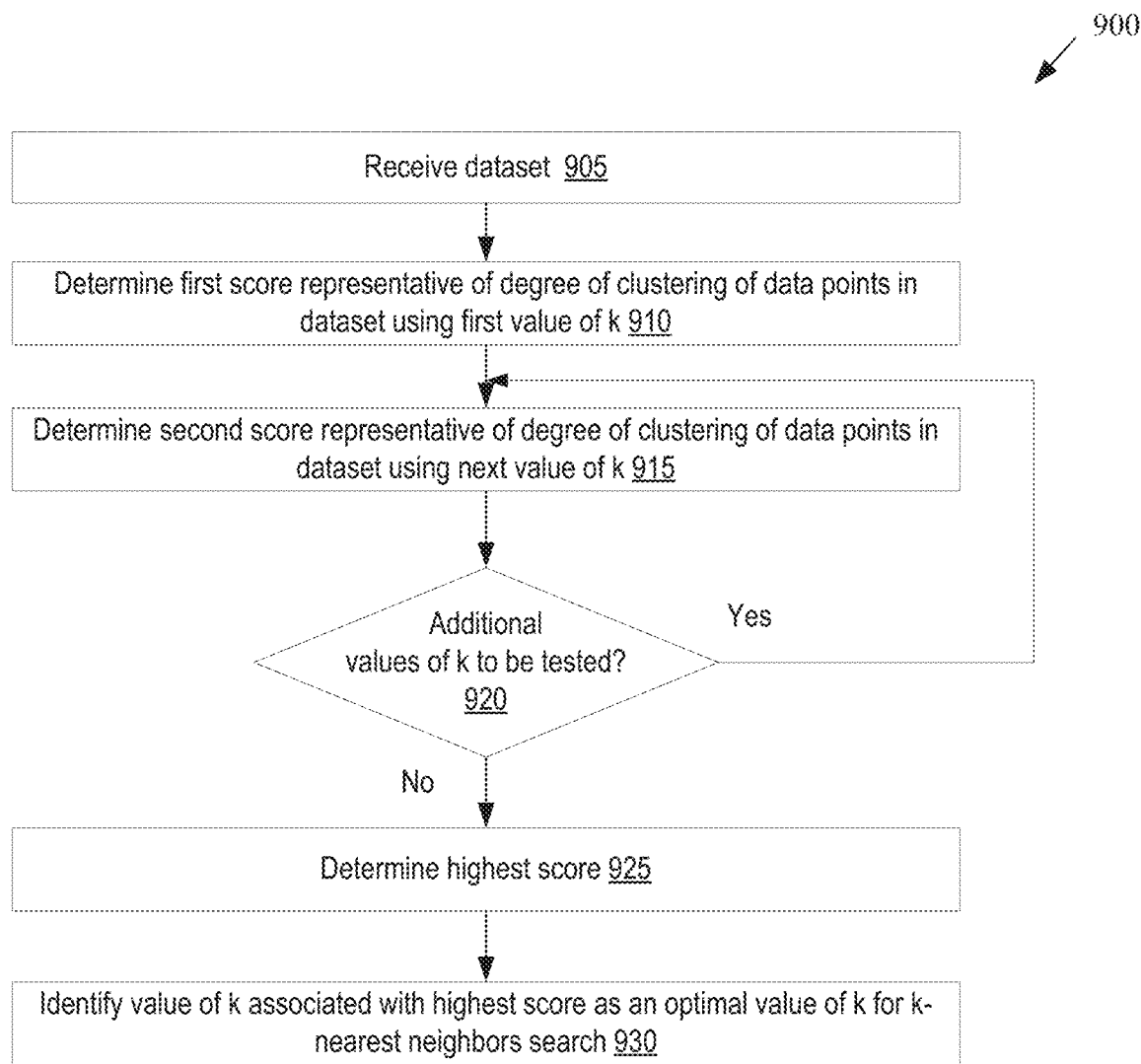
FIG. 9 depicts a flowchart illustrating one embodiment for a method of determining an optimal value of k for a k-nearest neighbors search to be applied by a machine learning model based on a dataset.

FIGS. 8-9 are flow diagrams showing various methods for determining the suitability of a dataset for use in machine learning, in accordance with embodiments of the invention. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a computing device executing a dataset suitability tester, such as dataset suitability tester 120 of FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 8 depicts a flowchart illustrating one embodiment for a method 800 of determining the change over time in the suitability of a dataset for use in machine learning. At block 805 of method 800, processing logic receives a dataset. The dataset includes a plurality of data points, where each data point of the plurality of data points comprises a representative vector for the data point and an associated classification for the data point. At block 810, processing logic determines a score representative of a degree of clustering of data points in the dataset. The score may be computed as described in embodiments above. At block 815, processing logic determines a suitability of the dataset for use in machine learning (e.g., for use in a machine learning model that applies a k-NN search) based on the score. The suitability may be determined as set forth in embodiments described above.

At block 820, processing logic receives additional data points for the dataset. The additional data points may be received over time. For example, the dataset may be a live dataset that constantly receives new data points. Processing logic may add the new data points to the dataset to generate an updated dataset. At block 825, processing logic determines a new score for the updated dataset using the same technique that was used to generate the score at block 815.

At block 830, processing logic determines whether the new score is higher than the original score. If the new score is higher than the original score, then the method continues to block 835 and processing logic determines that the addition of data points to the dataset improves a suitability of the dataset for use in machine learning. An improved suitability of the dataset causes the model generated from the dataset to have a high chance of true positives (correct classification of data) and/or a lower chance of false positives and/or false negatives. If the new score is the same as or lower than the original score, then the method continues to block 840 and processing logic determines that the addition of data points to the dataset does not improve the suitability of the dataset for use in machine learning.

FIG. 9 depicts a flowchart illustrating one embodiment for a method 900 of determining an optimal value of k for a k-nearest neighbors search to be applied by a machine learning model based on a dataset. At block 905, processing logic receives a dataset. The dataset includes a plurality of data points, where each data point of the plurality of data points comprises a representative vector for the data point and an associated classification for the data point. At block 910, processing logic determines a first score for the dataset, where the first score is representative of a degree of clustering of data points in the dataset using a first value of k for a k-nearest neighbors search. In one embodiment, the first score is determined by performing k-nearest neighbor search queries on one or more of the data points from the dataset using values of k from 1 to the first value of k. For example, if the first value of k is 5, then k-nearest neighbors search queries may be performed for values of k=1, 2, 3, 4 and 5. In one embodiment, the k-nearest neighbors search results are used to generate P-R curves for each of the data points. In one embodiment, an average area under the P-R curves is computed, and this average area is used as a value of the first score.

At block 915, processing logic determines a second score for the dataset, where the second score is representative of a degree of clustering of data points in the dataset using a second value of k. The second score may be determined by performing k-nearest neighbor search queries on the one or more of the data points from the dataset using values of k from 1 to the second value of k. For example, if the second value of k is 7, then k-nearest neighbors search queries may be performed for values of k=1, 2, 3, 4, 5, 6 and 7. In one embodiment, the k-nearest neighbors search results are used to generate P-R curves for each of the data points. In one embodiment, an average area under the P-R curves is computed, and this average area is used as a value of the second score.

At block 920, processing logic determines whether any additional values of k are to be tested. If so, the method returns to block 915, and an additional score is determined, where the additional score is representative of a degree of clustering of data points in the dataset using a next value of k. If no additional values of k are to be tested, the method continues to block 925.

At block 925, processing logic determines a highest score. At block 930, processing logic identifies the value of k associated with the highest score as an optimal value of k for a k-nearest neighbors search using the dataset.

Figure 10:
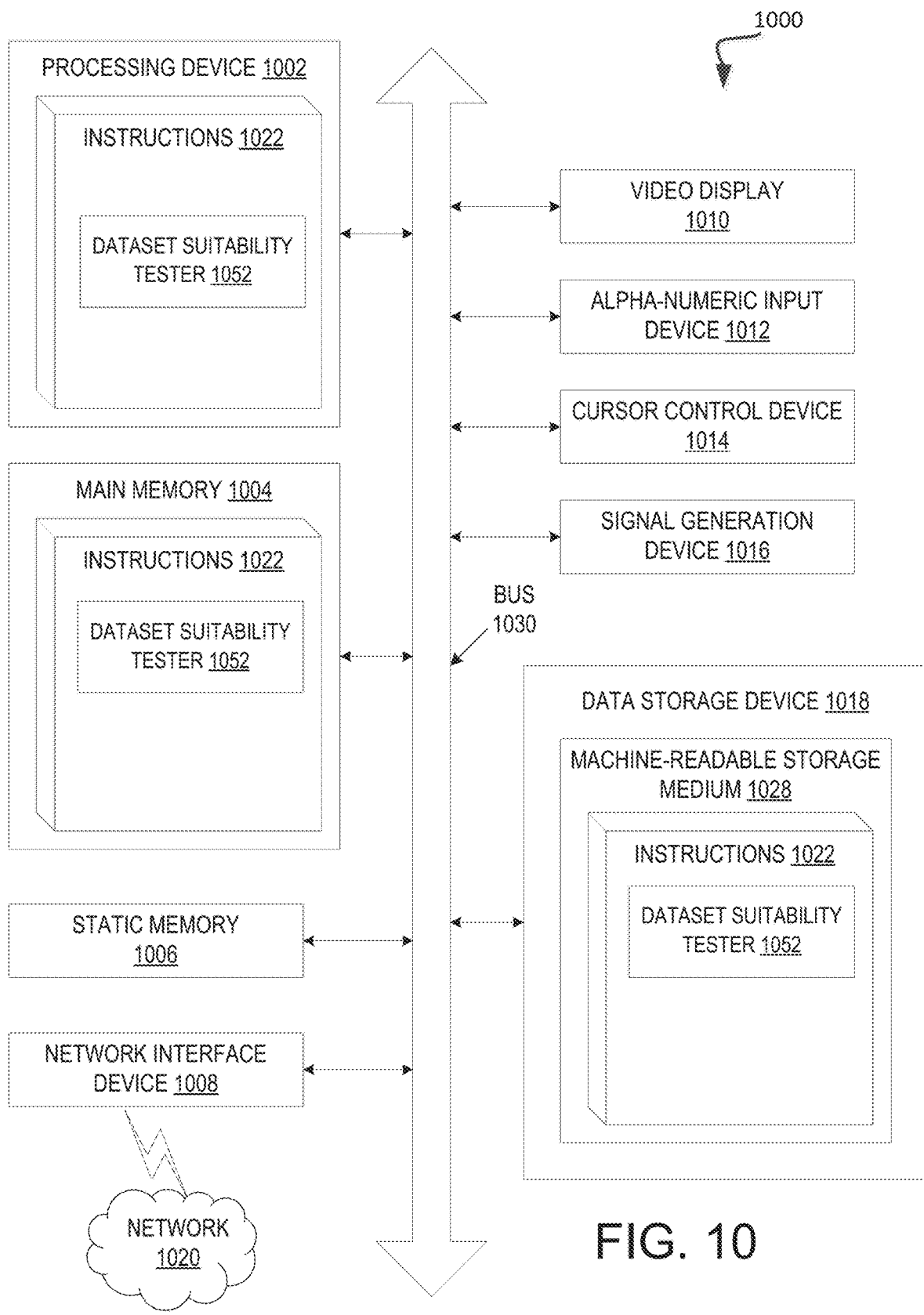
FIG. 10 is a schematic block diagram that provides one example illustration of a computing device executing a dataset suitability tester, according to one embodiment of the present disclosure.

FIG. 10 illustrates a diagrammatic representation of a machine in the exemplary form of a computer system 1000 within which a set of instructions, for causing the machine to perform any one or more of the methodologies discussed herein, may be executed. The system 1000 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device (processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions for a dataset suitability tester 1052 for performing the operations discussed herein. In one embodiment, dataset suitability tester 1052 corresponds to dataset suitability tester 120 of FIG. 1.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a computer-readable storage medium 1028 on which is stored one or more sets of instructions of the dataset suitability tester 1052 embodying any one or more of the methodologies or functions described herein. The instructions may also reside, completely or at least partially, within the main memory 1004 and/or within processing logic of the processing device 1002 during execution thereof by the computer system 1000, the main memory 1004 and the processing device 1002 also constituting computer-readable media.

The instructions may further be transmitted or received over a network 1020 via the network interface device 1008. While the computer-readable storage medium 1028 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory computer-readable medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention. In the above description, numerous details are set forth.

It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "determining", "computing", "performing", "discarding", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A device comprising:
a processing device; and
a memory to store computer executable instructions that, if executed, cause the processing device to:
perform a plurality of k-nearest neighbors search queries with various values of k on a dataset, wherein the dataset comprises a plurality of data points, and wherein each data point of the plurality of data points comprises a representative vector for the data point and an associated classification for the data point, wherein a first set of the plurality of data points comprises a first classification and a second set of the plurality of data points comprises a second classification;
determine a score representative of a degree of clustering of the plurality of data points from results of the plurality of k-nearest neighbors search queries, wherein the score is determined based on a first degree of clustering of data points classified with the first classification of the first set of the plurality of data points and a second degree of clustering of data points classified with the second classification of the second set of the plurality of data points; and
determine a suitability of the dataset for use in generating a k-nearest neighbors search machine learning model based on a comparison of the score to a threshold.

2. The device of claim 1, wherein the instructions, if executed, further cause the processing device to:
determine a plurality of scores, wherein each of the plurality of scores is determined using a different value of k for a k-nearest neighbors search of the plurality of k-nearest neighbors search queries;
determine a value of k that resulted in a highest score from the plurality of scores; and
determine that the value of k that resulted in the highest score is an optimal value of k for the k-nearest neighbors search.

3. The device of claim 1, wherein the instructions, if executed, further cause the processing device to:
compute a plurality of precision-recall curves, wherein a separate precision-recall curve is computed for two or more data points of the plurality of data points based on results of a plurality of k-nearest neighbors search queries associated with the two or more data points;
for each precision-recall curve of the plurality of precision-recall curves, compute an area under the precision-recall curve; and
compute an average area under the plurality of precision-recall curves, wherein the score representative of the degree of clustering of the plurality of data points is based on the average area under the plurality of precision-recall curves.

4. The device of claim 1, wherein the instructions, if executed, further cause the processing device to:
determine one or more first precision-recall curves having a highest area;
determine one or more second precision-recall curves having a lowest area; and
discard the one or more first precision-recall curves and the one or more second precision-recall curves.

5. The device of claim 1, wherein the instructions, if executed, further cause the processing device to:
perform a number of k-nearest neighbors search queries for a data point of the plurality of data points, where the number is equal to s−1, where s is a size of the dataset, and where each of the number of k-nearest neighbors search queries uses a different value of k that is between 1 and s−1, inclusive.

6. The device of claim 1, wherein the instructions, if executed, further cause the processing device to:
receive a plurality of additional data points for the dataset, wherein addition of the plurality of additional data points to the dataset results in an updated dataset;
determine a new score for the updated dataset;
compare the score to the new score; and
determine whether the new score is greater than the score.

7. A method comprising:
receiving a dataset comprising a plurality of data points, wherein each data point of the plurality of data points comprises a representative vector for the data point and an associated classification for the data point, wherein a first set of the plurality of data points comprises a first classification and a second set of the plurality of data points comprises a second classification;
determining, for the dataset, a score representative of a degree of clustering of the plurality of data points from results of a plurality of k-nearest neighbors search queries, wherein the score is determined based on a first degree of clustering of data points classified with the first classification of the first set of the plurality of data points and a second degree of clustering of data points classified with the second classification of the second set of the plurality of data points; and
determining a suitability of the dataset for use in machine learning based on a comparison of the score to a threshold.

8. The method of claim 7, wherein the suitability of the dataset is determined for a k-nearest neighbors search.

9. The method of claim 8, further comprising:
determining a plurality of scores, wherein each of the plurality of scores is determined using a different value of k for the k-nearest neighbors search;
determining a value of k that resulted in a highest score from the plurality of scores; and
determining that the value of k that resulted in the highest score is an optimal value of k for the k-nearest neighbors search.

10. The method of claim 7, further comprising:
performing a plurality of k-nearest neighbors search queries with various values of k on the dataset, wherein the score is determined based on combined results of the plurality of k-nearest neighbors search queries.

11. The method of claim 10, further comprising:
computing a plurality of precision-recall curves, wherein a separate precision-recall curve is computed for two or more data points of the plurality of data points based on results of a plurality of k-nearest neighbors search queries associated with the two or more data points;
for each precision-recall curve of the plurality of precision-recall curves, computing an area under the precision-recall curve; and
computing an average area under the plurality of precision-recall curves, wherein the score representative of the degree of clustering of the plurality of data points is based on the average area under the plurality of precision-recall curves.

12. The method of claim 11, further comprising:
determining one or more first precision-recall curves having a highest area;
determining one or more second precision-recall curves having a lowest area; and
discarding the one or more first precision-recall curves and the one or more second precision-recall curves.

13. The method of claim 10, wherein performing the plurality of k-nearest neighbors search queries comprises:
performing a number of k-nearest neighbors search queries for a data point of the plurality of data points using various values of k between a and s−1, inclusive, where s is a size of the dataset.

14. The method of claim 13, wherein performing the plurality of k-nearest neighbors search queries further comprises performing the number of k-nearest neighbors search queries for each additional data point of the plurality of data points.

15. The method of claim 7, further comprising:
comparing the score to a threshold;
determining that the score meets or exceeds the threshold; and
determining that the dataset is suitable for use in machine learning.

16. The method of claim 7, further comprising:
receiving a plurality of additional data points for the dataset to obtain an updated dataset;
determining a new score for the updated dataset;
comparing the score to the new score; and
determining whether the new score is greater than the score.

17. A non-transitory computer-readable storage device storing computer-executable instructions that, if executed by a processing device, cause the processing device to:
perform a plurality of search queries on a dataset, wherein the dataset comprises a plurality of data points, wherein each data point of the plurality of data points comprises a representative vector for the data point and an associated classification for the data point, and wherein a first set of the plurality of data points comprises a first classification and a second set of the plurality of data points comprises a second classification;
determine a score representative of a degree of clustering of the plurality of data points from results of the plurality of search queries, wherein the score is determined based on a first degree of clustering of data points classified with the first classification of the first set of the plurality of data points and a second degree of clustering of data points classified with the second classification of the second set of the plurality of data points; and
determine a suitability of the dataset for use in machine learning based on a comparison of the score to a threshold.

18. The non-transitory computer-readable storage device of claim 17, wherein the machine learning comprises a k-nearest neighbors search, and wherein the plurality of search queries comprise a plurality of k-nearest neighbors search queries with various values of k.

19. The non-transitory computer-readable storage device of claim 18, wherein the instructions, if executed, further cause the processing device to:
compute a plurality of precision-recall curves, wherein a separate precision-recall curve is computed for two or more data points of the plurality of data points based on results of k-nearest neighbors search queries from the plurality of k-nearest neighbors search queries that are associated with the two or more data points;
for each precision-recall curve of the plurality of precision-recall curves, compute an area under the precision-recall curve; and
compute an average area under the plurality of precision-recall curves, wherein the score representative of the degree of clustering of the plurality of data points is based on the average area under the plurality of precision-recall curves.

20. The non-transitory computer-readable storage device of claim 19, wherein performing the plurality of k-nearest neighbors search queries comprises:
performing a number of k-nearest neighbors search queries for a data point of the plurality of data points using various values of k between 1 and s−1, inclusive, where s is a size of the dataset; and
performing the number of k-nearest neighbors search queries for each additional data point of the plurality of data points.

* * * * *